United States Patent [19]

Wood et al.

[11] Patent Number: 4,606,096

[45] Date of Patent: Aug. 19, 1986

[54] CHAIN TENSIONER

[75] Inventors: Sherman L. Wood, Horton; Charles F. Crissy, Jackson, both of Mich.

[73] Assignee: Aeroquip Corporation, Jackson, Mich.

[21] Appl. No.: 727,753

[22] Filed: Apr. 26, 1985

[51] Int. Cl.[4] ............................................. F16B 7/12
[52] U.S. Cl. .............................. 24/68 CT; 24/68 CD; 248/613
[58] Field of Search .......... 24/68 CT, 68 CD, 68 TT; 410/99; 248/613

[56] References Cited

U.S. PATENT DOCUMENTS

| | | | |
|---|---|---|---|
| 1,159,472 | 11/1915 | Christofferson | 24/68 CT |
| 1,802,589 | 4/1931 | Thompson | 248/613 |
| 2,389,562 | 11/1945 | Storch | 248/613 |
| 3,142,877 | 8/1964 | Lesley | 24/68 CT |
| 3,366,997 | 2/1968 | Lesley | 24/68 CT |
| 3,601,864 | 8/1971 | Roberts et al. | 24/68 CT |
| 3,718,946 | 3/1973 | Lunsford et al. | 24/68 CT |
| 3,949,961 | 4/1976 | Pamer | 248/613 |
| 4,335,489 | 6/1982 | Muller et al. | 24/68 CT |
| 4,401,198 | 8/1983 | Kunczynski | 248/613 |
| 4,525,900 | 7/1985 | Muller et al. | 24/68 CT |

Primary Examiner—Victor N. Sakran
Attorney, Agent, or Firm—Beaman & Beaman

[57] ABSTRACT

The invention pertains to apparatus for tensioning chains as may be used to tie down and position cargo. A pair of elongated members each have an outer end on which a tension transmitting fitting is mounted, and at their inner ends the members are telescopingly interrelated and adjustably interconnected through a resilient impact cushion placed under compression by tension forces transmitted between the members. A non-compressible sleeve prevents overcompression of the impact cushion and the apparatus includes adjustable elements for precompressing the cushion.

12 Claims, 5 Drawing Figures

CHAIN TENSIONER

BACKGROUND OF THE INVENTION

Heavy duty cargo tie-down systems may utilize chains as the tension members and the present invention pertains to systems of this type. Cargo tie-downs of the chain type must use tensioners which are easily operated by inexperienced personnel, must be capable of easily tensioning the chain after the chain has been connected to the tensioner, and the chain must be easily released from the tensioner without having to gradually release the tension.

As chain-type cargo tie-down systems are of a nonelastic character in that the chain does not expand or elongate under tension, the chains of the system must be properly tensioned, and maintain the desired tension, if impacts and jarring are to be avoided due to a tendency for the cargo to shift. Previously, available chain tensioners for tie-down systems have not had the ability to effectively cushion impacts arising from high tension forces imposed upon the tensioner.

A chain tensioner for cargo tie-down systems is shown in the assignee's U.S. Pat. No. 3,601,864 issued Aug. 31, 1971, and while the chain tensioner shown therein solves many of the previous problems, this tensioner is not capable of cushioning impact forces and absorbing high tension impact forces which may damage or render inoperable known chain tensioners.

It is an object of the invention to provide a chain tensioner for cargo tie-down systems which is of concise configuration, may be operated by relatively inexperienced personnel, and is capable of cushioning high tension impact forces.

Another object of the invention is to provide a chain tensioner for cargo tie-down systems capable of cushioning impact forces wherein tightening of the chain may be readily accomplished and the operating characteristics of the tightener may be adjusted by imposing a prestressed condition on the cushioning material.

In the practice of the invention two elongated members are interconnected in a telescoping relationship. The first member includes an outer end upon which a latching head is defined which includes a latch hook pivotally mounted thereon for movement between operative and release positions relative to a grab link defined on the chain being tensioned. The latch hook is held in the operative position by a pivotal detent operated by a release ring rotatably mounted on the latching head having an internal cam cooperating with a pin plate which positions the detent. This structure permits the chain grab link to be readily inserted into the latching head and held therein by the latch hook, or easily released by actuation of the release ring.

A threaded stem non-rotatably extends from the latching head and telescopingly receives the tubular inner end of a second elongated member. The outer end of the second member includes a tension transmitting fitting in the form of a hook wherein the second member may be releasably attached to a fixed bar forming a part of the cargo container, bulkhead or other stationary component.

A housing constituting an enlarged nut is threaded upon the stem threads, and the housing includes an annular chamber in which the second member inner end is received. A radial flange defined on the second member within the housing chamber is in opposed relationship to an adjustable shoulder nut threaded into the housing and defining a portion of the chamber, and an impact cushioning element, in the form of an annular urethane ring, is interposed between the flange and the shoulder nut whereby tension between the first and second members compresses the urethane and relative movement between the flange and housing occurs as the urethane is compressed.

An annular sleeve within the housing chamber of an axial length less than the normal axial length of the urethane cushion surrounds the cushion and is interposed between the flange and housing shoulder nut and will engage these components upon predetermined displacement taking place between the flange and housing during cushioning. The sleeve will prevent excessive deformation and overcompression of the cushion material and permit the apparatus to accommodate very high impact tension forces without damage. The housing shoulder nut is axially adjustable to apply a precompression to the cushion material which will assure the proper orientation of the components, and prevent inadvertent rotation of the housing relative to the stem which would permit the tensioner to accidentally unloosen.

Another improvement in the instant invention pertains to the utilization of a notch defined in the pin plate employed to actuate the latch hook detent. The detent includes an arm extension closely received within a notch defined in the pin plate radially positioned by the release ring, and by confining the detent arm within the notch, a positive actuation of the detent is assured at all locations of rotation of the release ring preventing inadvertent release of the latch hook during operation of the release ring.

DESCRIPTION OF THE PREFERRED EMBODIMENT

Figure 1:
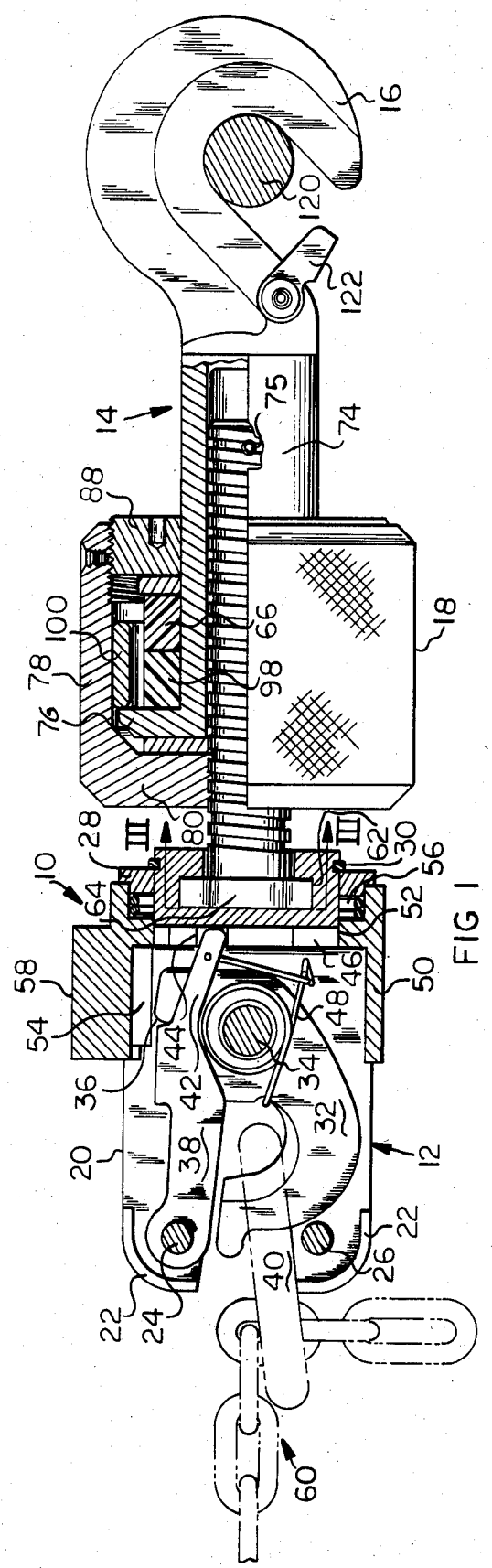
Figure 2:
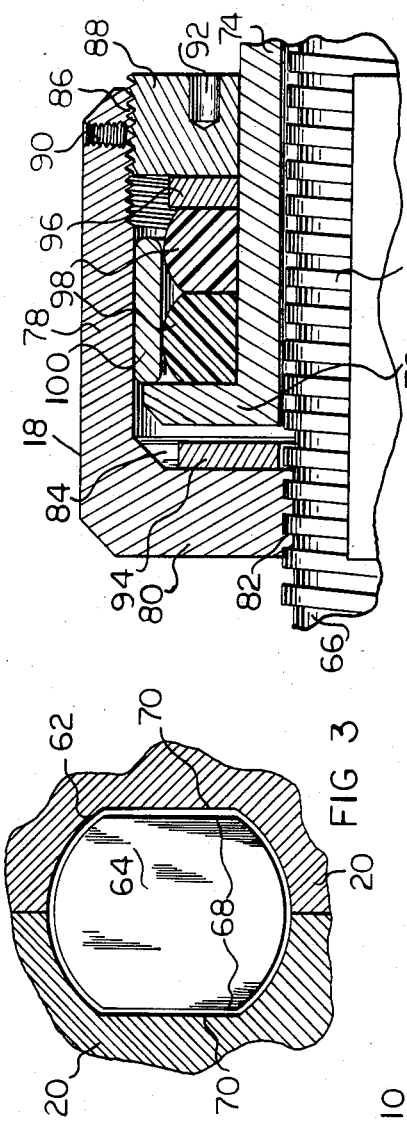
Figure 4:
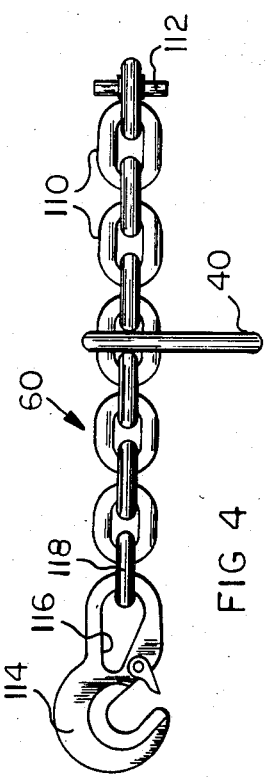
Figure 5:
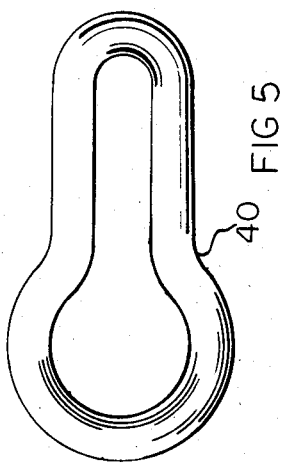
Figure 3:

The aforementioned objects and advantages of the invention will be appreciated from the following description and accompanying drawings wherein:

FIG. 1 an elevational view, partially in section, illustrating a chain tensioner in accord with the invention, the cushion material being illustrated in its normal noncompressed state, FIG. 2 is an enlarged, detail, sectional, elevational view of the housing and chamber illustrating the relationship of the components during impact cushioning, FIG. 3 is a detail, elevational, sectional view of the stem head as taken along Section III—III of FIG. 1, FIG. 4 is an elevational view of the chain assembly preferably used with the tensioner, and FIG. 5 is an elevational view of a grab link used with the chain assembly.

DESCRIPTION OF THE PREFERRED EMBODIMENT

With reference to FIG. 1, the tensioner is of an elongated configuration consisting of a member 10 upon which the latch head 12 is defined, and the member 14 upon which the tension transmitting fitting hook 16 is formed. These two members are telescopingly interrelated by cylindrical housing 18 in which the impact cushion apparatus is located.

The latching head 12 is similar in most respects to the apparatus shown in assignee's U.S. Pat. No. 3,601,864, and the disclosure thereof is incorporated by reference into this specification. The latching head consists of a pair of shell halves 20 which are of a cast fabrication and include mating flat surfaces 22 held together by bolts 24 and 26 and the end cap ring 28 held in position by the retaining ring 30. The outer ends of the shell halves define a flared opening receiving the latch hook 32 pivotally mounted on the head by shaft 34. The latch hook 32 includes an abutment 36 engaged by the yoke shaped detent 38 pivotally mounted upon bolt 24, and in FIG. 1 the detent is shown engaging the latch hook abutment 36 which positions the latch hook in the operative position illustrated whereby the chain grab link 40 may be retained within the latch head.

The detent 38 includes extension arms 42 which are received within notches 44 defined upon opposite sides of the pin plate 46 radially displaceable within the head 12, and springs 48 attached to the detent bias the detent towards the shaft 34.

The radial position of the pin plate 46 is determined by a release ring 50 rotatably mounted upon the latch head 12. The ring 50 includes an internal cam surface 52 engaging the ends of the pin plate, and as the ring is rotated the plate is radially displaced by the cam. The release ring 50 includes an inwardly extending boss 54 adapted to overlie the detent when the detent 38 and abutment 36 are engaged to hold the latch hook 32 in the operative position, and the release ring torsion return spring 56 imposes a torsional force on the release ring in the direction permitting the detent to engage the latch hook.

As the notches 44 defined in the pin plate 46 closely receive the detent extension arms 42, the position of the detent 38 will, at all times, be under control of the pin plate, whose position will be determined by the release ring 50 and cam 52, and accordingly, a positive interconnection exists between the detent and pin actuator plate in both directions of movement of the pin plate which is an improvement over the structure shown in U.S. Pat. No. 3,601,864, and prevents inadvertent detent movement during the intermediate rotational positioning of the release ring.

An enlargement 58 is defined upon the release ring 50 which provides a striking surface for a hammer in the event that such force is required to rotate the release ring due to extraordinarily high tension in the chain 60 on which grab link 40 is attached, or icy conditions.

A recess 62 is defined by the shell halves 20 for receiving the head 64 of the threaded stem 66, and as will be appreciated from FIG. 3, the head is of a non-circular configuration including flats 68 which cooperate with flats 70 defined in the recess 62 preventing relative rotation between the latch head and the stem. The stem 66 is provided with a heavy duty thread 72 such as a 6 Acme thread, class 3-G, and at its outer end the stem is provided with a roll pin 75 of a length equal to the diameter of the threads 72 to prevent the housing 18 from being removed from the stem.

The member 14 includes a tubular cylindrical inner end 74 which is telescopingly received upon the threads 72 of stem 66 for axial displacement thereon without rotation. The end of the member 14 includes an annular radially extending flange 76 disposed at right angles to the axis of the inner end of member 14.

The cylindrical housing 18 forms a nut threaded upon the stem 66. The housing includes a cylindrical side wall 78 and a radial end wall 80 in which the threaded bore 82 is defined mating with the threads 72 of the stem. The housing 18 forms an annular chamber 84, and the outer end of the chamber is threaded at 86 to receive an annular nut 88 comprising a shoulder element which may be axially positioned by set screw 90. Holes 92 permit a spanner wrench to rotate the nut 88.

An annular thrust bearing 94 is located between the housing end wall 80 and the flange 76, and an annular steel bearing 96 is located adjacent the nut 88 within chamber 84. The impact cushioning material comprises a pair of annular urethane rings 98 located between the flange 76 and bearing 96, and as will be appreciated from FIG. 1, the rings 98 are closely received upon the diameter of the inner end of the member 14. In their normal operating condition, the rings 98, together, define an axial dimension as appreciated from FIG. 1.

An annular sleeve 100 is also located within the chamber 84 between the flange 76 and nut 88, and the axial dimension of the sleeve 100 is less than the axial dimension defined by the urethane rings 98. As will be appreciated from FIG. 1, the sleeve 100 is of a larger diameter than the rings 98 and a radial clearance exists between the outer diameter of the rings and the inner diameter of the sleeve providing clearance for the urethane to radially expand outwardly when under compression.

The chain 60 used with the tensioner of the invention is shown in FIGS. 4 and 5, and includes a plurality of identical links 110 upon which the grab link 40 may be positioned as desired in the known manner. A retainer pin 112 is located in the end link and a hook 114 is affixed to the other end of the chain section. The hook 114 includes an enlarged opening 116 receiving the adjacent chain link 118 whereby, if desired, the hook 114 may be directly received within the latch head 12 for engagement of opening 116 with the latch hook 32.

Prior to use, the set screw 90 will be unloosened and the nut 88 rotated within the housing 18 to impose a desired precompression on the urethane rings 98. This precompression results from the nut 88 forcing the bearing 96, rings 98 and flange 76 to the left, FIG. 1, for engagement with the steel thrust bearing 94 which engages end wall 80, and the nut 88 is positioned wherein the components within the housing 18 will be in firm engagement with each other, but the housing may be manually rotated upon the stem 66. The outer surface of the housing 18 may be knurled to facilitate manual rotation.

In use, the housing 18 will initially be rotated in the direction to axially translate the housing and member 14 away from the latch head 12 thereby extending the length of the tensioner. This adjustment occurs easily as housing 18 and member 14 rotate together as the housing rotates on the stem threads 72. As the housing 18 is threaded along the stem it will be prevented from leaving the stem by engagement of the pin 75 with the threaded bore 82, but usually, the housing would not be translated to this extent.

The fitting hook 16 is attached to the fixed anchor bar 120, and retained thereon by the spring biased retainer 122, and the chain hook 114 will then be attached to the load to be secured, not shown. The grab link 40 is located on the chain 60 such that the slack will be taken out of the chain and the grab link inserted into the latch head for retention by the latch hook 32. Thereupon, the housing 18 is rotated to translate the housing along the stem toward the latch head 12 which will tension the chain as desired. Upon release of the housing the housing will retain its adjusted position on the stem due to the preloading.

In the event of impact tension forces being imposed on the tightener the tendency for the members 10 and 14 to separate is resisted by the compression of the urethane rings 98. The chain tensioner in accord with the invention is designed to withstand up to 35,000 pounds of tension, and high compressive forces interposed on the urethane rings will cause relative movement between the housing 18 and member 14 compressing the rings 98 as illustrated in FIG. 2. This compression of the rings as the impact forces are cushioned causes the ring material to bulge outwardly toward the sleeve 100 and under extreme relative axial displacement between the housing 18 and member 14 the sleeve 100 will directly engage the flange 76 and shoulder nut 88 preventing further axial displacement therebetween. Upon the impact forces subsiding the elastic character of the urethane rings will bias the flange 76 away from the nut 88 and the normal condition of the components within the housing 18 will be restored.

If the tightener was not adequately originally tightened, or if due to severe vibration or load shifting, slight slack in the chain 60 has occurred, the precompression of the urethane rings within the housing 18 produces enough resistance to rotation of the housing to prevent additional housing rotation and chain slackening.

It is appreciated that various modifications to the inventive concepts may be apparent to those skilled in the art without departing from the spirit and scope of the invention.

We claim:

1. A tensioning device comprising, in combination, a first member having an outer end and an elongated stem, a second member having an outer end and a tubular inner end telescopingly received upon said first member stem, a head mounted upon said first member outer end, a latch mounted on said head pivotal between operative and release positions, latch operating means mounted upon said head operating said latch between said operative and release positions, a tension connection fitting defined on said second member outer end, a housing adjustably selectively axially positionable upon said stem, and compressible resilient tension force cushioning means interposed between said housing and said second member inner end whereby tension forces transmitted between said first and second member are imposed on said resilient tension force cushioning means.

2. In a tensioning device as in claim 1, threads defined on said first member stem, said housing comprising a nut threaded on said stem, an annular chamber defined within said nut, said second member inner end being reciprocally received within said nut, a radial flange defined on said second member inner end within said nut chamber, a radial annular shoulder defined on said nut partially defining said chamber and in spaced axial relationship to said flange, said resilient tension force cushioning means being interposed between said flange and said shoulder.

3. In a tensioning device as in claim 2, means selectively axially positioning said annular shoulder on said nut to selectively precompress said resilient tension force absorbing means.

4. In a tension device as in claim 2, an annular noncompressible sleeve within said nut chamber interposed between said flange and annular shoulder and of an axial length less than the normal axial length of said tension force cushioning means whereby said sleeve will restrict relative movement between said flange and annular shoulder to the length of said sleeve and limit the compressive force imposed upon the tension force cushioning means.

5. In a tensioning device as in claim 2, said resilient tension force cushioning means comprising at least one elastomeric ring.

6. In a tensioning device as in claim 5, said elastomeric ring being formed of urethane.

7. A tensioning device comprising, in combination, a first member having an outer end and an elongated stem, a second member having an outer end and an inner end telescopingly received upon said first member stem, a head mounted on said first member outer end, a pivotal latch mounted on said head, a detent pivotally mounted on said head selectively engagable with said latch pivotal between latch locking and latch releasing positions, detent operating means mounted on said head selectively pivoting said detent between said latch locking and releasing positions, a tension transmitting fitting defined on said second member outer end, resilient tension force cushioning means defined on said second member inner end connecting said second member to said first member stem in selected axial position thereon, said tension force cushioning means including a housing comprising a body having an annular side wall circumscribing said second member inner end and radially spaced therefrom, and a radial end wall, engaging positioning means defined on said housing and stem selectively axially positioning said housing upon said stem comprising threads defined on said stem and a threaded bore receiving said stem defined on said housing, said threaded bore being centrally defined in said end wall, said side and end wall defining an annular chamber within said housing body having an open end disposed toward said second member outer end, a radially extending annular shoulder member fixed to said housing body enclosing said chamber open end, said second member inner end being telescopingly received within said housing, an abutment defined on said second member inner end within said housing comprising an annular radially extending flange within said chamber in axially spaced opposed relation to said shoulder member, said resilient tension force cushioning means circumscribing said second member inner end within said chamber and axially interposed between said shoulder member and said flange whereby axial tension forces between said members is transmitted through said tension force cushioning means.

8. In a tensioning device as in claim 7, said shoulder member comprising an annular nut threaded into said housing body side wall at said chamber open end for selective axial positioning on said body, said housing end wall limiting axial separation of said flange and annular nut whereby positioning of said nut within said chamber open end imposes an axial predetermined compression on said tension force cushioning means.

9. In a tensioning device as in claim 7, said resilient tension force cushioning means comprising an elastomeric ring.

10. In a tensioning device as in claim 9, said elastomeric ring being formed of urethane.

11. In a tensioning device as in claim 9, an annular noncompressible sleeve within said chamber having an axial length less than the axial length of said elastomeric ring and in radial alignment with said ring interposed between said flange and shoulder member, said sleeve engaging said flange and shoulder member upon predetermined compression of said ring occurring to limit ring compression.

12. In a tensioning device as in claim 7, a ring rotatably mounted on said head rotatable between latch locking and latch releasing positions, a radially extending cam defined on said ring, a detent actuator pin slidably mounted in said head for movement in a radial direction engagable and displaceable by said cam, a notch defined in said actuator pin receiving an extension of said detent whereby said pin pivots said detent between said latch locking and releasing positions, said notch closely receiving said detent extension to correlate detent positioning with said actuator pin position.

* * * * *